Figure 1:
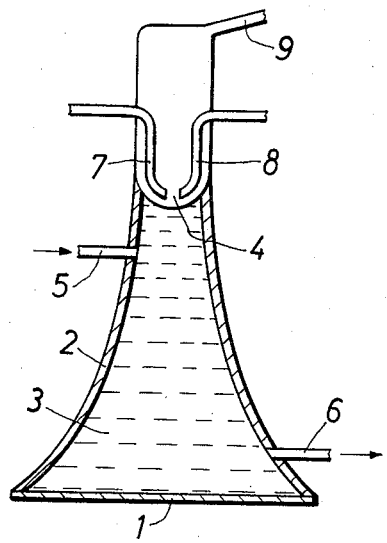

May 3, 1966 H. SCHNÖRING ETAL 3,249,453
ULTRASONIC PREPARATION OF FINELY DISPERSED DYESTUFF
Filed July 24, 1962

INVENTORS:
HILDEGARD SCHNÖRING, MATTHÄUS SCHÖNAMSGRUBER, RUDOLF ERDMENGER, HANS-HEINZ MÖLLS,
BY Connolly and Hutz
their ATTORNEYS 3,249,453
ULTRASONIC PREPARATION OF FINELY
DISPERSED DYESTUFF
Hildegard Schnöring, Wuppertal-Elberfeld, Matthäus Schönamsgruber, Cologne-Stammheim, Rudolf Erdmenger, Bergisch Gladbach, and Hans-Heinz Mölls, Cologne-Flittard, Germany, assignors to Farbenfabriken Bayer Aktiengesellschaft, Leverkusen, Germany, a German corporation
Filed July 24, 1962, Ser. No. 212,027
Claims priority, application Germany, July 29, 1961, F 34,566
6 Claims. (Cl. 106—309)

This invention relates to a process for the production of finely-dispersed dyestuffs and pigments.

For the production of pigment or dyestuff pastes or powders, which are colloidally dispersible in water, for the greatest variety of purposes, water moistened dyestuff press cakes are mixed with dispersing agents and these pastes subjected to a comminution process in mills of a great variety of types; until the pigments show the desired fine dispersion. The particle size of these water-insoluble dyestuffs or pigments fall below 1μ. By drying the finely-dispersed, dispersion agent-containing dyestuff pastes, corresponding powders can be produced which are colloidally dispersible in water. A requirement for the effectiveness of the above-mentioned milling process is, in general, the production of the finest pigment or dyestuff primary particles by a precipitation process with simultaneous loose secondary agglomeration of these particles. For this purpose, a large number of processes have been elaborated and have been described in the patent literature. These require either directly producing the water-insoluble dyestuff by mixing together at least partially water-soluble reaction components (e.g., diazonium salt and coupling components) or dissolving the pigment formed in another way in a solvent and precipitating the dyestuff from solution by the addition of another liquid medium, whereby the precipitation medium must be miscible with the solvent but does not dissolve the dyestuff or the pigement.

As solvents for dyestuffs, there is included organic acids, such as formic acid, acetic acid, etc., organic bases, such as pyridine, and, above all, water-miscible solvents, such as mono- and polybasic alcohols, glycol monoethers, lower ketones, etc. The most widely used solvents for many pigments and dyestuffs are concentrated inorganic acids, such as $H_3PO_4$, $HClO_4$, $HCl$ and, above all, $H_2SO_4$ and also oleum in different concentrations. The dyestuffs are dissolved in the mentioned agents and the dyestuff solution allowed to run, e.g., into water, whereby differing precipitation results are obtained with regard to the crystal form and the particle size of the pigment or of the dyestuff depending upon the concentration, temperature, speed of stirring, and the additions of salt or dispersing agents to the dyestuff solution or to the water used. The initially mentioned wet milling property of the pigment also differs.

It has now been found that the precipitation result, be it (1) by the production of dyestuffs from soluble or partially soluble starting components, e.g., in the formation of azo dyestuffs or (2) by the reprecipitation of previously prepared dyestuffs from suitable solvents, can be considerably influenced, and leads to dyestuffs or pigments with outstanding physical properties when ultrasonic waves are allowed to act on the resulting dyestuff or pigment particles in statu noscendi, i.e., during the precipitation process. It has surprisingly been found that dyestuffs or pigments are obtained which possess outstanding physical properties. On the one hand the material can be easily filtered off with suction and on the other hand, can be converted into highly dispersed suspensions by only a short milling with dispersion agents in aqueous suspension.

The new process is demonstrated in the devices in the accompanying drawings. In the drawings the parts are identified as a
  1, ultrasonic wave source;
  2, coupling funnel which concentrates the intensity given off by the ultrasonic source to the required intensity;
  3, transmission fluid which, at the same time, can serve as cooling fluid for the reaction chamber 4;
  4, reaction chamber;
  5 and 6, connection pipes for the admission and exit of the cooling or transmission fluid;
  7 and 8, entry pipes for the solutions of the starting components or precipitation fluid or the starting components herefor; and
  9, exit pipes for the precipitated product.

The solutions of at least two starting components—in the case of using several starting components, an apparatus can be used, if necessary, with a correspondingly greater number of introduction tubes—run at a suitable temperature through the introduction tubes or entry pipes 7 and 8, combine, with the formation of dyestuff or pigment, by flowing together between the exit openings of the entry pipes in the plane of maximum sound energy, which is adjusted by concentration of the ultrasonic waves of the ultrasonic source 1, and flow off via the exit pipe 9, whereby, by suitable construction of the device, i.e., depending on the height of the reaction chamber over the exit openings of the entry pipes, the flow off passes through rooms having a decreasing sound intensity gradient.

The process can be carried out not only continuously but also discontinuously. Particularly favourable results are frequently obtained when the distance between the exit openings of the entry pipes lies in the range of 3–10 mm. The intensity of the sound waves, as well as their frequency, are to be adjusted to the nature of the starting components used, which can easily be determined from case to case by preliminary tests. For this purpose, it is, for example, possible to proceed in such a manner that the desired physical form of the dyestuff or pigment particles, beginning with a low or high initial value of the sound intensity, is microscopically followed after removal from the reaction chamber and, with slow increasing or reduction of the wattage of the ultrasonic source, the value determined corresponding to the optimum properties of the desired end product, e.g., the fine division of the pigment. In the same way, the most suitable frequency can be ascertained. Surprisingly, it has hereby been shown that, in the case of the action of ultrasonic waves on the dyestuff formation in statu nascendi, a definite energy threshold value must first be reached in order to achieve the desired improvement of the physical properties of the precipitated dyestuffs or pigments. If the sound intensity is increased beyond this value, then only a gradual improvement of the fine division of the pigment or dyestuff can be observed. Satisfying results are obtained in general if the ultrasonic sound intensity on the place of the dyestuff respectively pigment formation is about 20 to 500 watt/cm.$^2$, preferably 50 to 300 watt/cm.$^2$. Frequencies of the ultrasonic waves of about 15 to 8000 kHz., preferably 300 to 2000 kHz., can be used. The reaction components respectively the dyestuffs and pigments formed should remain in the precipitation zone under the influence of the ultrasonic sound waves for about 0.01 to 10 seconds, preferably about 0.05 to 1 second.

Optimum results are, in particular, achieved with the process according to the invention when the maximum of the sound intensity lies as nearly as possible in the plane of the exit openings of the entry pipes. With a corresponding construction of the apparatus, according to the height of the reaction chamber over the exit opening of the entry pipe, there is given a shorter or longer zone of decreasing sound intensity, which also determines the residence time of the precipitated dyestuffs or pigments in the ultrasonic field. This zone is of particular importance for the final physical form of the pigments or dyestuffs obtained since here the initially resulting very finely divided primary particles obviously come together to give secondary agglomerates, whereby with an increasing residence time larger agglomerates are obtained. Obviously, the size of the primary particles is regulated in the zone of maximum sound density during the precipitation process and the size of the agglomerates is regulated in the zones of decreasing or lesser sound density. Good results are obtained in general if the entire residence time of the products to be treated in the space treated with the ultrasonic sound waves is about 20 to 100 times the residence time of the precipitation zone as mentioned before. It is obvious that the entire space which is treated with the ultrasonic sound waves can be divided as well in several rooms whereby in one the precipitation takes place and whereby in subsequent rooms the after-treatment with the sound waves can be carried out with a diminished sound intensity.

In the case of dyestuffs or pigments with marked crystallisation properties, it is recommended to use ultrasonic waves of higher frequency. In these cases, it has proved to be advantageous to allow the two or more streams of liquid, for example dyestuff dissolved in concentrated sulfuric acid and water as precipitation medium, to flow from two exit openings, or from several exit openings which correspond to the number of streams of liquid, which lie closely opposite one another, whereby the sound intensity in the plane of the exit openings amounts to at least 50 watt/cm.$^2$ and the frequency of the ultrasonic waves lies above 100 kHz. Since the transmission fluid, which serves for the transmission of the ultrasonic waves, warms up during the passage of the ultrasonic waves, it is, of course, necessary to provide suitable cooling and suitable tempering of the entering and leaving streams of liquid.

The dyestuffs and pigments obtainable according to this process are characterised, as a result of their fine division, by very good physical properties and they are consequently useable, with particular advantage, in a large number of fields of use. It is known that pigments can be dispersed by the influence of ultrasonic sound waves. This process, which has obtained no practical importance, is different from the process of the invention, since thereby the ultrasonic sound waves are applied during the formation of dyestuffs and pigments whereby the size and the character of the primary particles is influenced. In contrast thereto the ultrasonic sound waves have been applied according to the known art to dyestuff and pigment dispersion prepared by dispersing dyestuffs and pigments in liquid diluents. Thereby practically only the size and properties of the secondary particles is influenced but not the size of the primary particles. The process of the invention has, furthermore, the advantage that only small spaces namely the precipitation zones have to be treated with the high intensities of the ultrasonic sound waves while by the process of the art large volumes must be treated with these high intensities, which makes these processes uneconomical.

The following examples illustrate the new process for the production of finely-dispersed dyestuff preparations, without limiting the scope of the invention to the particular forms described.

*Example 1*

By the dissolving of 10 kg. of 4,4'-dibenzoylamido-1,1'-dianthrimide in 90–100 kg. of 96% sulfuric acid, there is obtained, with simultaneous carbazolation, a dyestuff solution in concentrated sulfuric acid of about 10% Indanthrene Olive R in the form of its hydrocarbazole (Schulz Dyestuff Tables, 7th edition, No. 1224). This dyestuff solution is now mixed with water in the apparatus illustrated in FIGURE 1, with simultaneous ultrasonic sound waves irradiation, whereby the dyestuff precipitates out as the hydrocarbazole. The reaction chamber of the precipitation apparatus was 5 cc., the ultrasonic intensity 150 watt/cm.$^2$ at an ultrasonic frequency of 0.8 mHz. and the put-through rate of 5 liter/hour of the dyestuff solution in concentrated sulfuric acid, which was cooled to −15° C., whereby precipitation at the ratio of 15 liter/hour was effected with water tempered to 1° C. The temperature of the resulting dyestuff suspension was 37° C. This dyestuff suspension is oxidised in known manner at 80° C. with sodium dichromate (about 4 kg. for the given material used) until the initially formed hydrocarbazole is converted into the carbazole. After filtering off the dyestuff and washing until neutral, this moist filter cake can be worked up in known manner to highly dispersed pastes or powders by the addition of a dispersing agent. The dyestuff filter cake with a pure dye content of about 25% is mixed with 30–50% of sulfite water liquor, referred to the weight of the pure dyestuff, whereby fluidisation occurs and a millable dyestuff paste is obtained. By grinding the paste in an ordinary ball mill with iron or steatite balls for only 2 to a maximum of 8 hours, a paste is obtained with a highly dispersed division of the dyestuff (practically all particles under 1μ).

If, in an analogous manner, the concentrated sulfuric acid solution of Indanthrene Olive R is precipiated in the usual way with water, but without ultrasonic treatment, and the hydrocarbazole analogously oxidised with dichromate, then a dyestuff filter cake is obtained which, with a completely analogous working up with sulfite waste liquor and grinding in the same mill, requires a substantially longer milling time of one to several days in order to achieve only approximately the same degree of dispersion as is possessed by the paste which results by a precipitation in the presence of ultrasonic waves.

*Example 2*

Working is carried out analogous to that of Example 1 but using instead of 4,4'-dibenzoylamido-1,1'-dianthrimide 10 kg. of 4,5'-dibenzoylamido-1,1'-dianthrimide, the intermediate product of Indanthrene Brown R (Schulz Dyestuff Tables, 7th edition, No. 1227), dissolved in 90–100 kg. of approximately 98% H$_2$SO$_4$. The hydrocarbazole of the dyestuff resulting by passage through the ultrasonic precipitation apparatus of Example 1 is oxidised with sodium dichromate analogously to Example 1. Here, too, the superiority of the process is demonstrated in that the filter cake, worked up in the usual manner, with 30–50% of added dispersion agent, is converted into a fine state of division by milling or vigorous stirring at 10,000 r.p.m. considerably more quickly than in comparison with a dyestuff batch which has been obtained by normal precipitation without the action of ultrasonic waves. Whereas the fine division of particles with radii or less than 1 micron is achieved with the dyestuff exposed to the action of sound by milling for a few hours or, in the case of vigorous stirring, even within the space of an hour, the comparative milling or vigorous stirring of the dyestuff which has not been exposed to the action of sound lasts for one to several days in order to achieve the same comminution effect. As dispersion agents for the paste milling, there come into question the usually used compounds, inter alia, sulfite waste liquors (Na salt) and their condensation products with aniline, as well as the condensation product from β-naphthalene-sulfonic acid sodium salt with formaldehyde and a condensation product from Schäffer's salt with formaldehyde bisulfite and m-cresol.

*Example 3*

Figure 2:
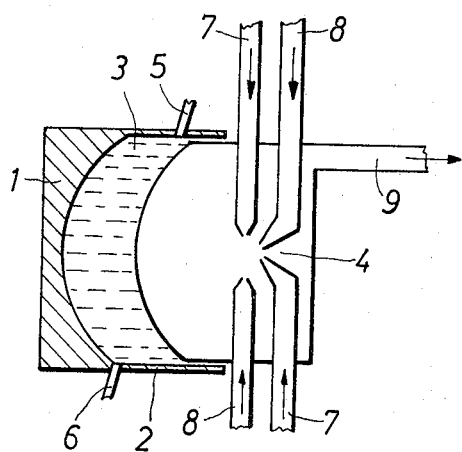

Analogously to Example 1, a precipitation of Indanthrene Olive R in sulfuric acid solution is carried out in the presence of ultrasonic waves, whereby, however, 30 g./liter potassium dichromate is added to the precipitation water, so that the initially formed hydrocarbazole has already been immediately oxidised to the carbazole in the presence of the ultrasonic waves when the exit temperature has been maintained at 45° C. Apart from an apparatus with a 5 cc. reaction chamber, there was also used a cylindrical upwardly extended reaction chamber with the same base area and thus with the same specific ultrasonic capacity (see FIGURE 2). In order to achieve this, the dyestuff solution in concentrated sulfuric acid was, in contra-distinction to Example 1, only cooled to −12° C.; the dichromate-containing precipitation water was adjusted to +5° C.; the put-through rate of the dyestuff solution and of the precipitation water through the reaction chamber of the ultrasonic precipitation apparatus amounted, in both cases, to 3 liter/hour at a sound intensity of 200 watt/cm.$^2$.

Here, too, the dyestuff thus irradiated with ultrasonic sound shows the same difference with regard to the milling property, as demonstrated with the untreated dyestuff in Example 1.

Furthermore, the dyestuff paste which has been ground for a few hours in the presence of 30–50% of sulfite waste liquor (Na salt) or its aniline condensation product (referred to the dyestuff content) and which has an outstanding degree of fine division, can be dried to a powdery dyestuff preparation when 120% of a condensation product from aniline and sulfite waste liquor (referred to the dyestuff content) is also worked into this paste. The drying of the dyestuff paste in the drying cabinet is preferably carried out between 50–70° C. There is then obtained a powdery dyestuff preparation which can be dispersed in water with the same outstanding fine division of the dyestuff with particles with radii of less than 1 micron. The dyestuff powder has the following composition:

49 parts Indanthrene Olive R 100%;
60 parts of a condensation product from aniline and sulfite waste liquor (Na salt);
or 40 parts Indanthrene Olive R 100%;
12 parts of sulfite waste liquor (Na salt); and
48 parts of a condensation product from aniline and sulfite waste liquor (Na salt).

If the analogous powder is produced from a dyestuff which has not been irradiated with sound, with only a short milling time of a few hours, the dyestuff preparations are obtained which are only dispersed in water with very coarse division of the dyestuff.

*Example 4*

In analogous manner, the preparation of an azo pigment, such as Hansagelb G (compare Schulz Dyestuff Tables, vol. I, 7th edition, No. 84), can be carried out by continuous coupling from the known components with simultaneous irradiation with ultrasonic waves. There is obtained a particularly intensively coloured pigment with an increased surface area in comparison with the precipitated product.

The production was carried out in known manner (compare Fierz-David, Grundlegende Operationen der Farbstoffchemie, Springer Verlag, 1938, pages 190 and 208) in that 17.7 kg. of pure acetanilide was dissolved in sodium hydroxide solution according to the given method, with the corresponding additives, and made up with water or with ice to a volume of 330 litres. According to the method, 3-nitro-4-toluidine, in the form of the hydrochloride, was analogously diazotised in known manner and made up to a volume of 185 litres.

These solutions are reacted in the apparatus illustrated in FIGURE 1, with simultaneous irradiation with sound, whereby the Hansagelb G is formed. The reaction chamber of the apparatus amounted to 50 cc., the ultrasonic intensity to 80 watts/cm.$^2$ at an ultrasonic frequency of 0.8 mHz. The put-through rate of the diazo solution amounted to 7.9 litres/hour and of the anilide solution to 14 litres/hour. Both solutions were cooled to +5° C. The temperature of the dyestuff suspension flowing off amounted to about 20° C.

In contradistinction to the known process in which a post reaction time of 2 hours is necessary, the dyestuff coupling is quantitatively terminated upon exit from the apparatus.

We claim:
1. A process for producing easily milled particles of a color component selected from the group consisting of dyestuff and pigment particles, comprising initially forming particles of color component in statu nascendi in an ultrasonic field having at the locus of formation a maximum of sound intensity, and thereafter exposing the color component to a zone of decreasing sound intensity, the ultrasonic field employed having a frequency range of about 15–8000 kHz. and an intensity of about 20–500 watt/cm.

2. A process according to claim 1 which comprises precipitating the color component at the place of the highest ultrasonic intensity and thereafter passing through zones of decreasing ultrasonic intensity.

3. The process of claim 1 wherein precipitation is effected during the production of dyestuffs from at least partially soluble starting components.

4. The process of claim 1 wherein precipitation is effected by reprecipitation of previously prepared dyestuff from solution.

5. A process according to claim 1 which comprises retaining the color component in the precipitation zone for 0.01 to 10 seconds.

6. A process according to claim 5 wherein the entire residence time of the color component in the ultrasonic field is 20–100 times the residence time in the precipitation zone at maximum sound intensity.

References Cited by the Examiner

UNITED STATES PATENTS

| | | | |
|---|---|---|---|
| 1,738,565 | 12/1929 | Claypoole | 106—309 |
| 2,163,649 | 6/1939 | Weaver | 106—309 |
| 2,323,877 | 7/1943 | Turbett | 106—309 |
| 2,460,546 | 2/1949 | Stephanoff | 106—309 X |
| 2,535,700 | 12/1950 | Seavey et al. | 204—154.1 X |
| 2,637,535 | 5/1953 | Arnold | 106—309 X |
| 2,738,172 | 3/1956 | Spiess | 256—1 |
| 2,755,195 | 7/1956 | Grubenmann | 106—309 |
| 2,896,922 | 7/1959 | Pohlman | 259—1 |

FOREIGN PATENTS 508,675  6/1939  Great Britain.

TOBIAS E. LEVOW, *Primary Examiner.*
JOHN R. SPECK, *Examiner.*